(12) United States Patent
Nail et al.

(10) Patent No.: US 10,393,202 B2
(45) Date of Patent: Aug. 27, 2019

(54) DAMPENING PILE GUIDE FOR FLOATING DOCK

(71) Applicant: CMI LIMITED CO., Marietta, GA (US)

(72) Inventors: Allen Jason Nail, Deltona, FL (US); Steve Hargrave, Roswell, GA (US); Charles Brown, Atlanta, GA (US)

(73) Assignee: CMI LIMITED CO., Marietta, GA (US)

( * ) Notice: Subject to any disclaimer, the term of this patent is extended or adjusted under 35 U.S.C. 154(b) by 0 days.

(21) Appl. No.: 15/830,820

(22) Filed: Dec. 4, 2017

(65) Prior Publication Data

US 2018/0156290 A1 Jun. 7, 2018

Related U.S. Application Data

(60) Provisional application No. 62/429,968, filed on Dec. 5, 2016.

(51) Int. Cl.

| E02B 3/26 | (2006.01) |
|---|---|
| E02B 3/28 | (2006.01) |
| F16F 1/36 | (2006.01) |
| F16F 15/08 | (2006.01) |
| E02B 3/06 | (2006.01) |
| E02B 17/00 | (2006.01) |
| E02B 3/12 | (2006.01) |
| F16F 1/54 | (2006.01) |

(52) U.S. Cl.
CPC ............... *F16F 1/36* (2013.01); *E02B 3/064* (2013.01); *E02B 3/126* (2013.01); *E02B 3/28* (2013.01); *E02B 17/003* (2013.01); *F16F 1/545* (2013.01); *F16F 15/08* (2013.01)

(58) Field of Classification Search
CPC .......... E02B 3/26; E02B 17/003; B63B 59/02
USPC ........................................ 405/213, 215, 221
See application file for complete search history.

(56) References Cited

U.S. PATENT DOCUMENTS

| 3,084,517 | A | * | 4/1963 | Bell | E02B 3/24 |
| | | | | | 114/220 |
| 4,043,287 | A | * | 8/1977 | Shorter, Jr. | B63B 35/38 |
| | | | | | 114/266 |
| 4,494,738 | A | * | 1/1985 | Britton | E02B 17/003 |
| | | | | | 267/140 |
| 4,887,934 | A | * | 12/1989 | Kramer | E02B 3/26 |
| | | | | | 405/213 |
| 6,230,644 | B1 | * | 5/2001 | Passen | B63B 3/06 |
| | | | | | 114/263 |

(Continued)

*Primary Examiner* — Frederick L Lagman
(74) *Attorney, Agent, or Firm* — Gardner Groff & Greenwald, PC

(57) ABSTRACT

Example embodiments of the invention generally relate to a dampening and impact absorption device including a first component, a second component, and at least one elastomeric element operatively coupled between the first component and the second component. Other example embodiments of the invention generally relate to a dampening and impact absorption system including one or more such dampening and impact absorption devices. In example applications, the dampening and impact absorption device is utilized to dampen and reduce impacts, forces and noise between the platform and anchor pilings of a floating dock system, for example resulting from wave action or other dynamic effects.

10 Claims, 17 Drawing Sheets

(56) References Cited

U.S. PATENT DOCUMENTS

| | | | | |
|---|---|---|---|---|
| 6,513,449 B1* | 2/2003 | Stewart | ............... | E02B 3/26 114/219 |
| 7,237,502 B1* | 7/2007 | Atkinson | ............... | E02B 3/26 114/219 |
| 7,617,792 B1* | 11/2009 | Pursley | ............... | E02B 3/26 114/219 |
| 7,640,881 B1* | 1/2010 | Gerst | ............... | B63B 3/08 114/263 |
| 8,166,901 B2* | 5/2012 | Gerst | ............... | B63B 35/38 114/220 |
| 9,487,925 B1* | 11/2016 | Meriwether | ............... | E02B 3/064 |
| 2004/0159273 A1* | 8/2004 | Rogerson | ............... | B63B 21/50 114/230.1 |
| 2006/0086301 A1* | 4/2006 | Chauncey | ............... | E02B 3/26 114/220 |
| 2011/0274502 A1* | 11/2011 | Tibedo | ............... | E02B 3/064 405/213 |
| 2016/0145822 A1* | 5/2016 | Gerst | ............... | B63C 1/02 114/263 |

\* cited by examiner

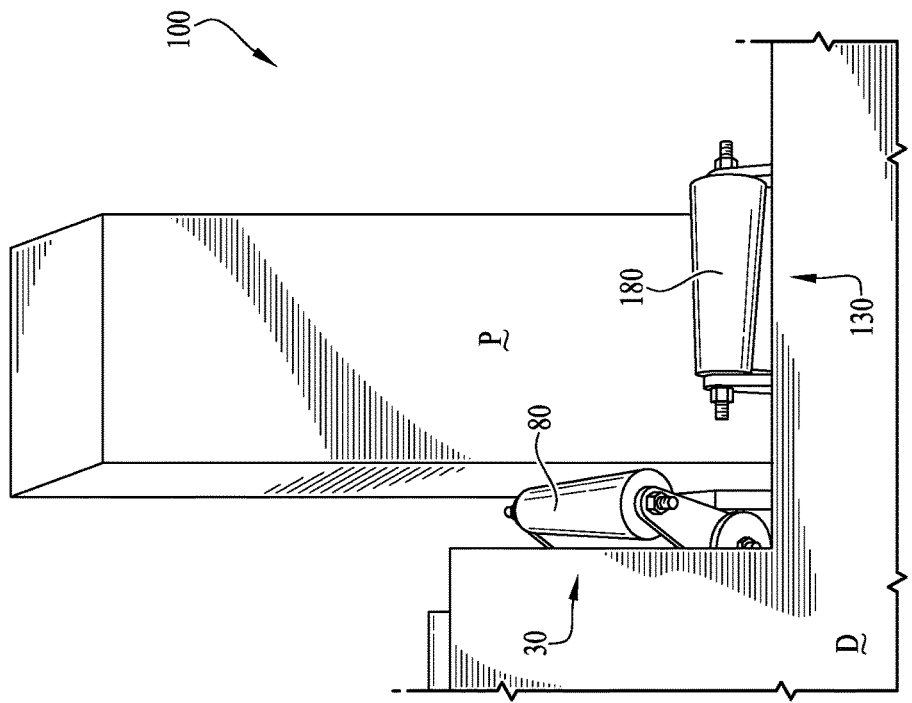
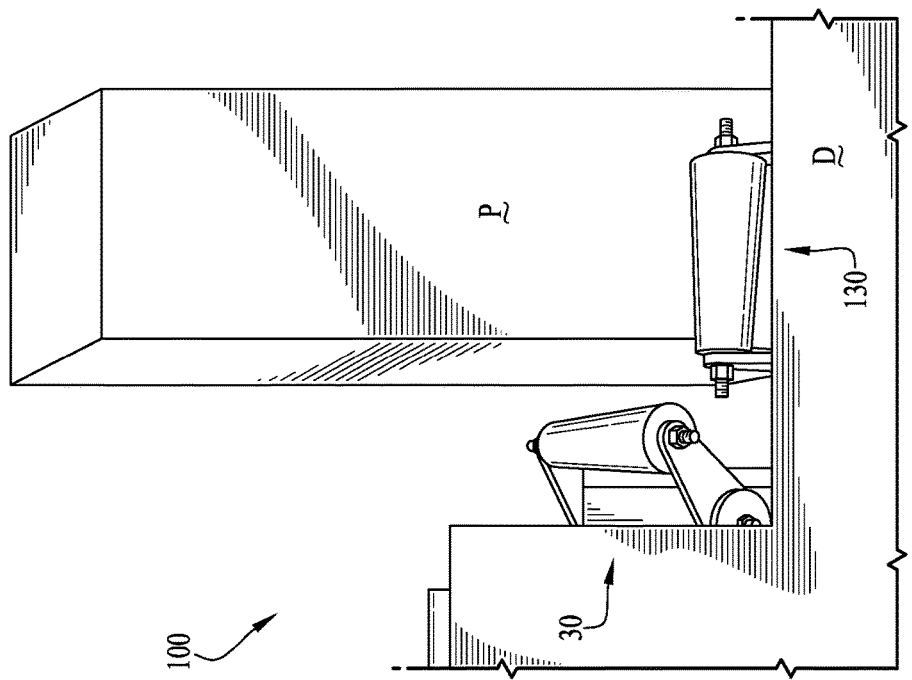

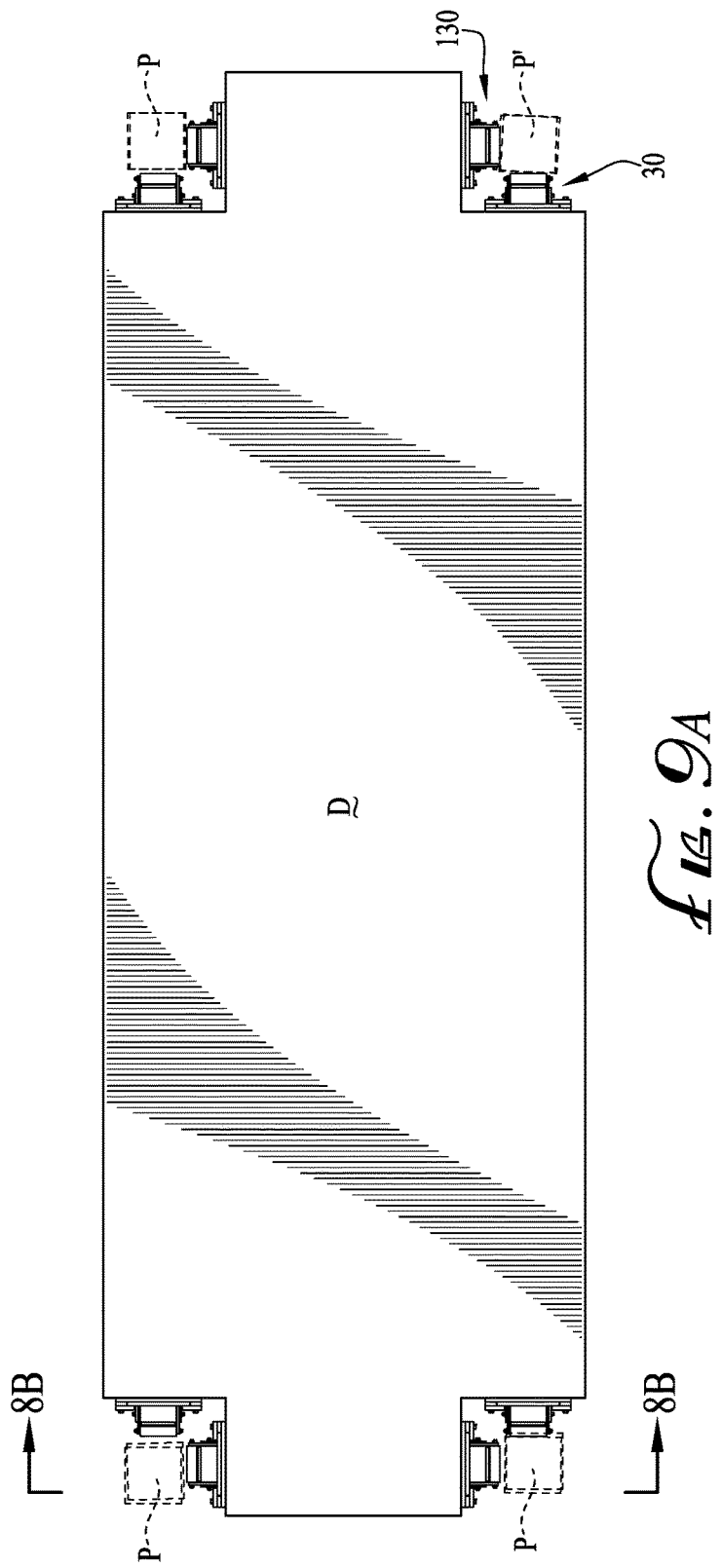

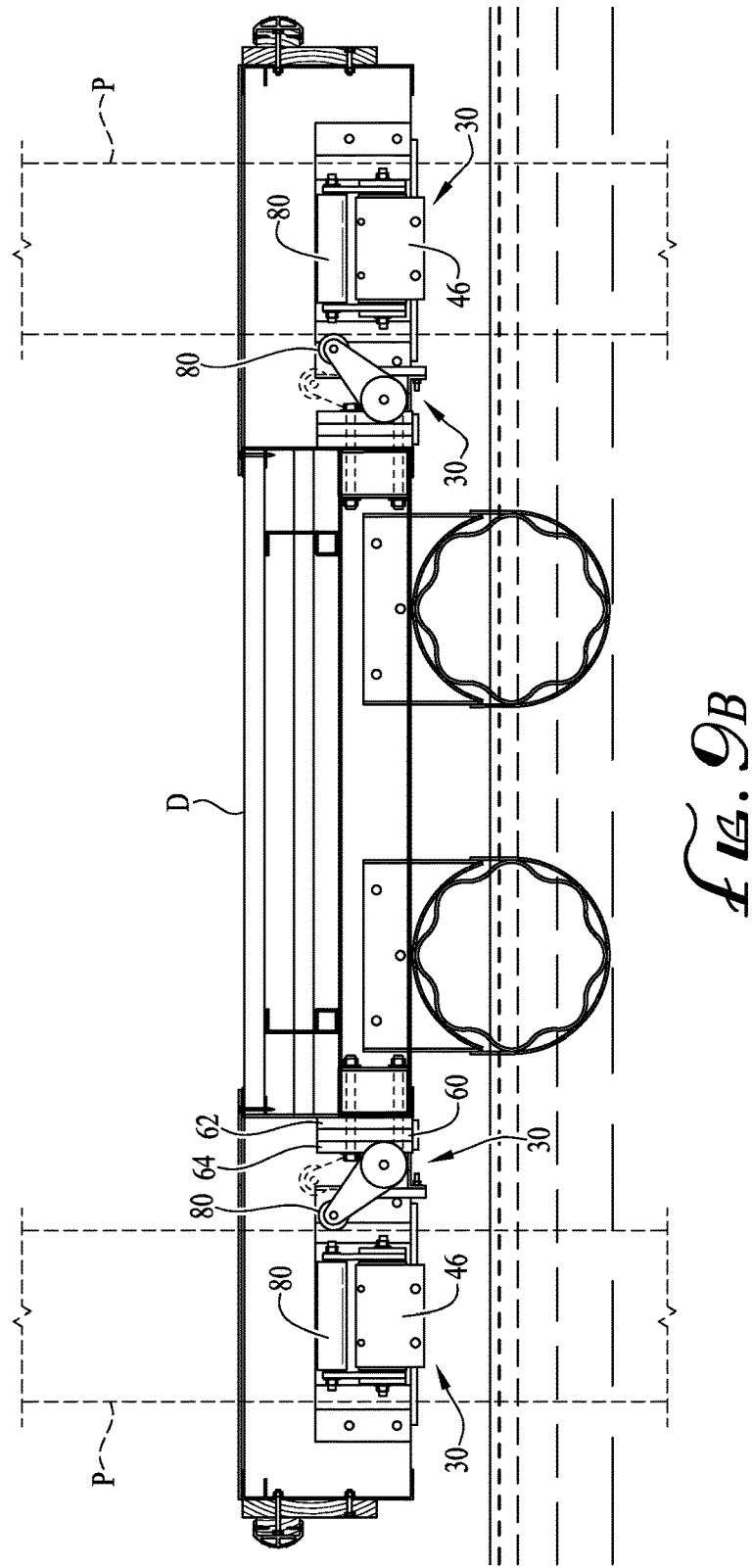

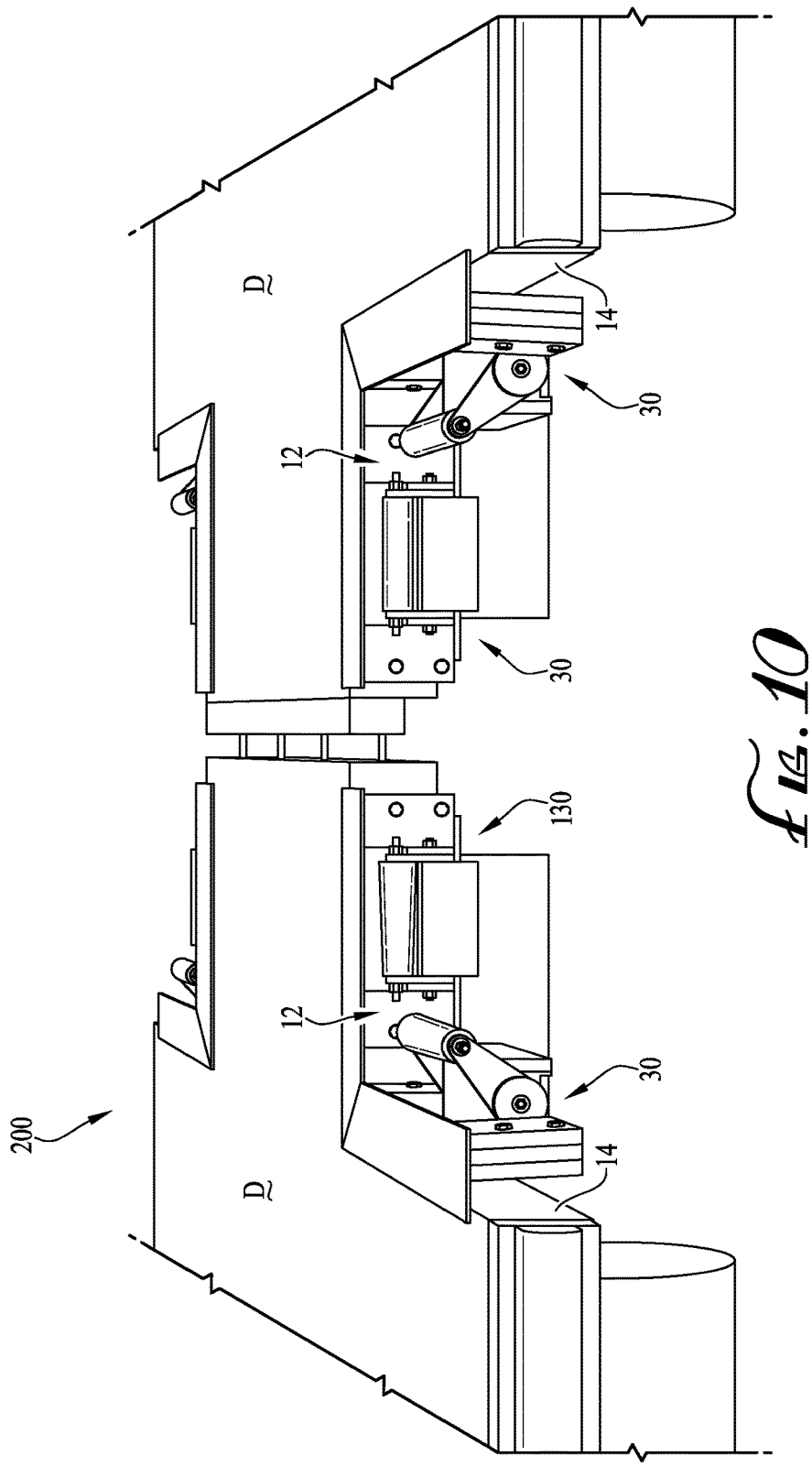

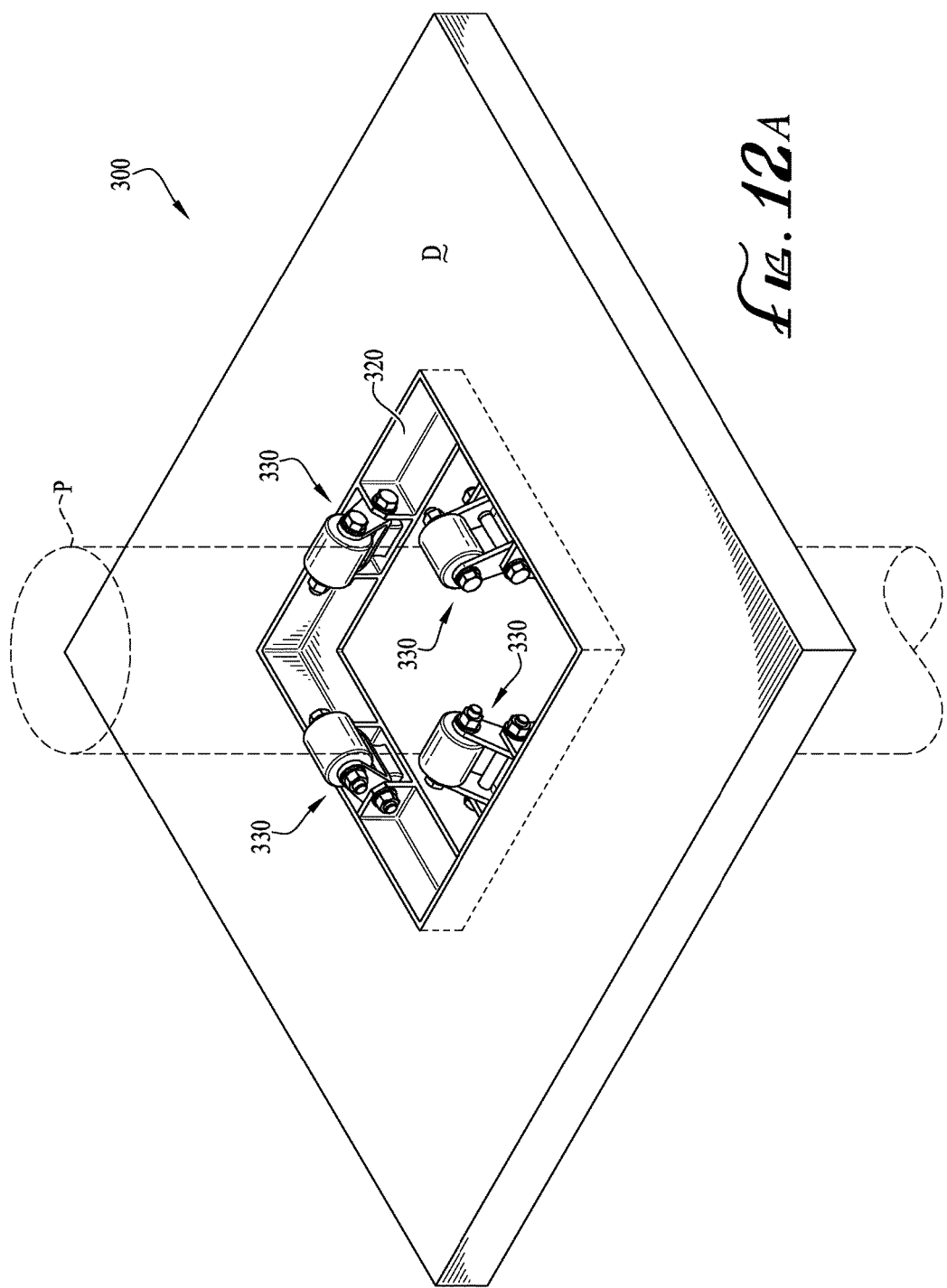

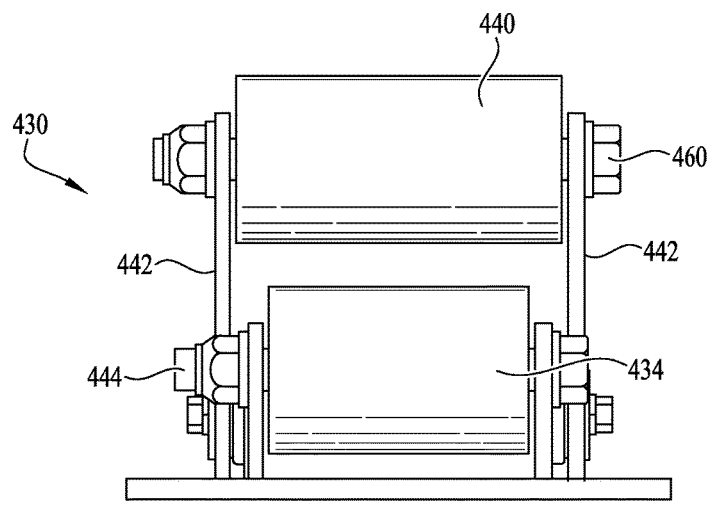
*Fig. 13C*
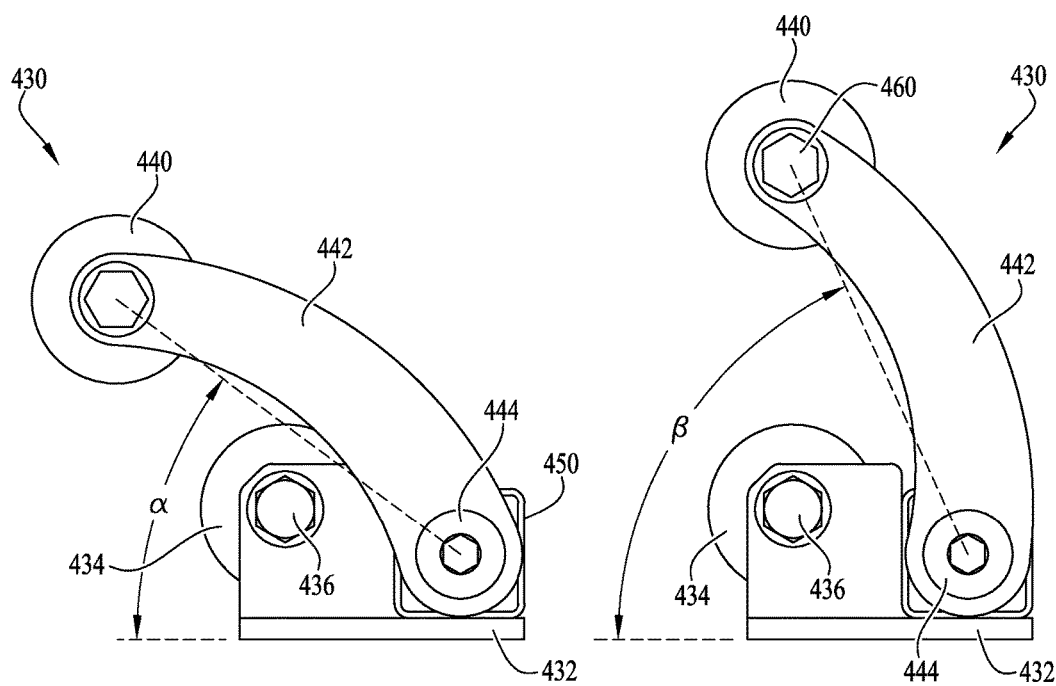
*Fig. 13D*  *Fig. 13E*

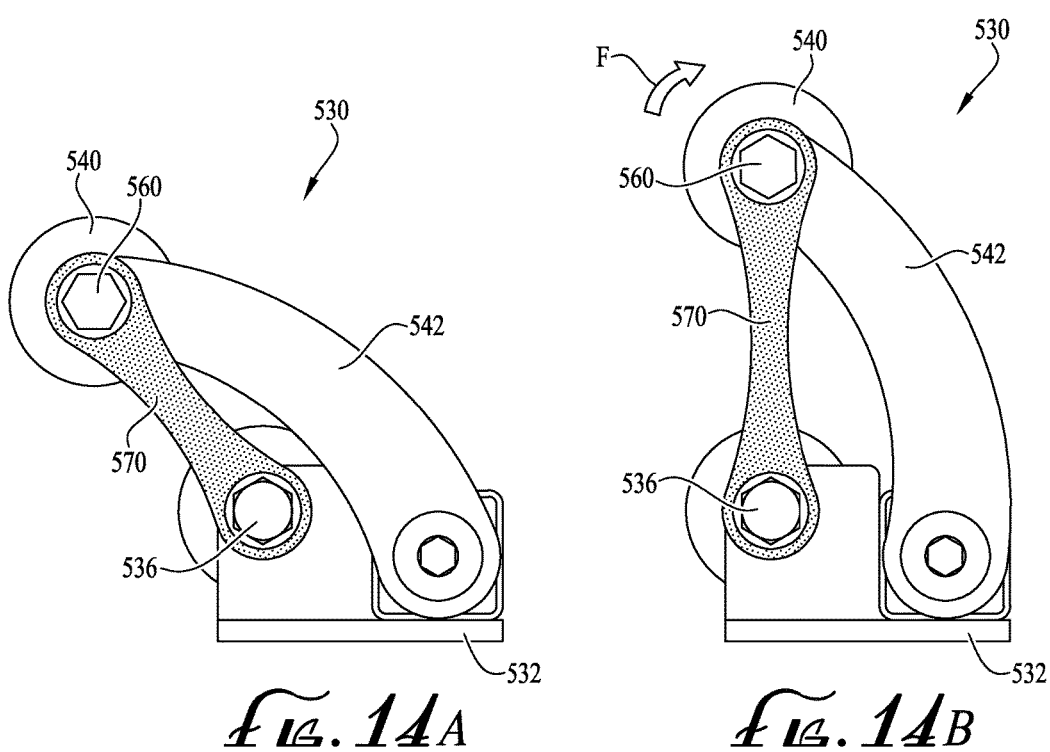

DAMPENING PILE GUIDE FOR FLOATING DOCK

CROSS-REFERENCE TO RELATED APPLICATION

This application claims priority to U.S. Provisional Patent Application Ser. No. 62/429,968 filed Dec. 5, 2016, which is hereby incorporated herein by reference in its entirety.

TECHNICAL FIELD

The present invention relates generally to the field of mechanical dampening and impact absorption devices, and more particularly to dampening and impact absorption devices incorporating resilient deformable dampening members, for example for use in connection with floating marine docks.

BACKGROUND

Mechanical dampening and impact absorption may be desirable in various applications. For example, in the field of floating marine docks, wave action, boat wakes, current, tides and other dynamic effects may cause lateral (horizontal or side-to-side) and/or transverse (vertical or up-and-down) motion of the dock platform relative to the pilings to which the dock platform is anchored. Repeated impacts of the dock platform or fixed guide rollers mounted to the dock platform against the anchor pilings resulting from wave action or other dynamic effects can damage the dock and generate undesirable noise and vibration.

Accordingly, it can be seen that needs exist for improved dampening and impact absorption devices, suitable for example for use in connection with floating marine docks or other applications. It is to the provision of improved dampening and impact absorption devices meeting these and other needs that the present invention is primarily directed.

SUMMARY

In example embodiments, the present invention provides improved dampening and impact absorption devices suitable for example for use in connection with floating marine docks or other applications. In example embodiments, one or more dampening and impact absorption devices according to the present invention are utilized in a dampening pile guide system to reduce or dampen impact forces transmitted from a floating dock platform to the dock's anchoring pilings, reduce or eliminate the potential for equipment damage from such forces, and reduce or eliminate noise generated by impact between dock components. In example forms, the dampening and impact absorption devices of the present invention incorporate one or more resilient, deformable elastomeric or otherwise deformable components allowing elastic deformation in one or more directions to reduce transmitted forces between adjacent components of a floating marine dock or other structural or dynamic system.

In one aspect, the present invention relates to a dampening and impact absorption device comprising and outer frame component and an inner component. The inner component is housed within and coaxially aligned with the outer frame component. The device further includes at least one dampening element operatively coupled between the outer frame component and the inner component.

In another aspect, the invention relates to a dampening and impact absorption system for a floating dock system comprising a floating dock platform positioned adjacent to a vertical piling. The dampening and impact absorption system comprises at least one dampening and impact absorption device attached to the floating dock platform adjacent to the vertical piling. The dampening and impact absorption device comprises a first component, a second component, and at least one dampening element operatively coupled between the first component and the second component. The dampening and impact absorption device further comprises at least one contact element configured to engage the vertical piling.

In still another aspect, the invention relates to dampening and impact absorption system for a system comprising a first movable component positioned adjacent to a second stationary component. The dampening and impact absorption system includes a dampening and impact absorption device comprising a base and a contact element pivotally coupled to the base. The base is configured to impede the pivotal movement of the contact element.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 8A is a detailed perspective view of the dampening pile guide system of FIG. 7 wherein the piling is not engaging a dampening and impact absorption device.

FIG. 8B is a detailed perspective view of the dampening pile guide system of FIG. 7 wherein the piling is engaging a dampening and impact absorption device.

FIG. 9A is a top view of the dampening pile guide system of FIG. 7.

FIG. 9B is a side view of the dampening pile guide system of FIG. 7.

FIG. 10 is a dampening pile guide system according to another example embodiment of the invention.

FIG. 12A is a dampening pile guide system comprising the dampening and impact absorption device of FIG. 11.

FIG. 13C is a front view of the dampening and impact absorption device of FIG. 13A.

FIG. 13D is a side view of the dampening and impact absorption device of FIG. 13A in a first, equilibrium position.

FIG. 13E is a side view of the dampening and impact absorption device of FIG. 13A in a second, dampening position.

FIG. 14A is a side view of a dampening and impact absorption device according to another example embodiment of the invention with the device in a first, equilibrium position.

FIG. 14B is a side view of the dampening and impact absorption device of FIG. 14A with the device in a second, dampening position.

DETAILED DESCRIPTION OF EXAMPLE EMBODIMENTS

Figure 1:
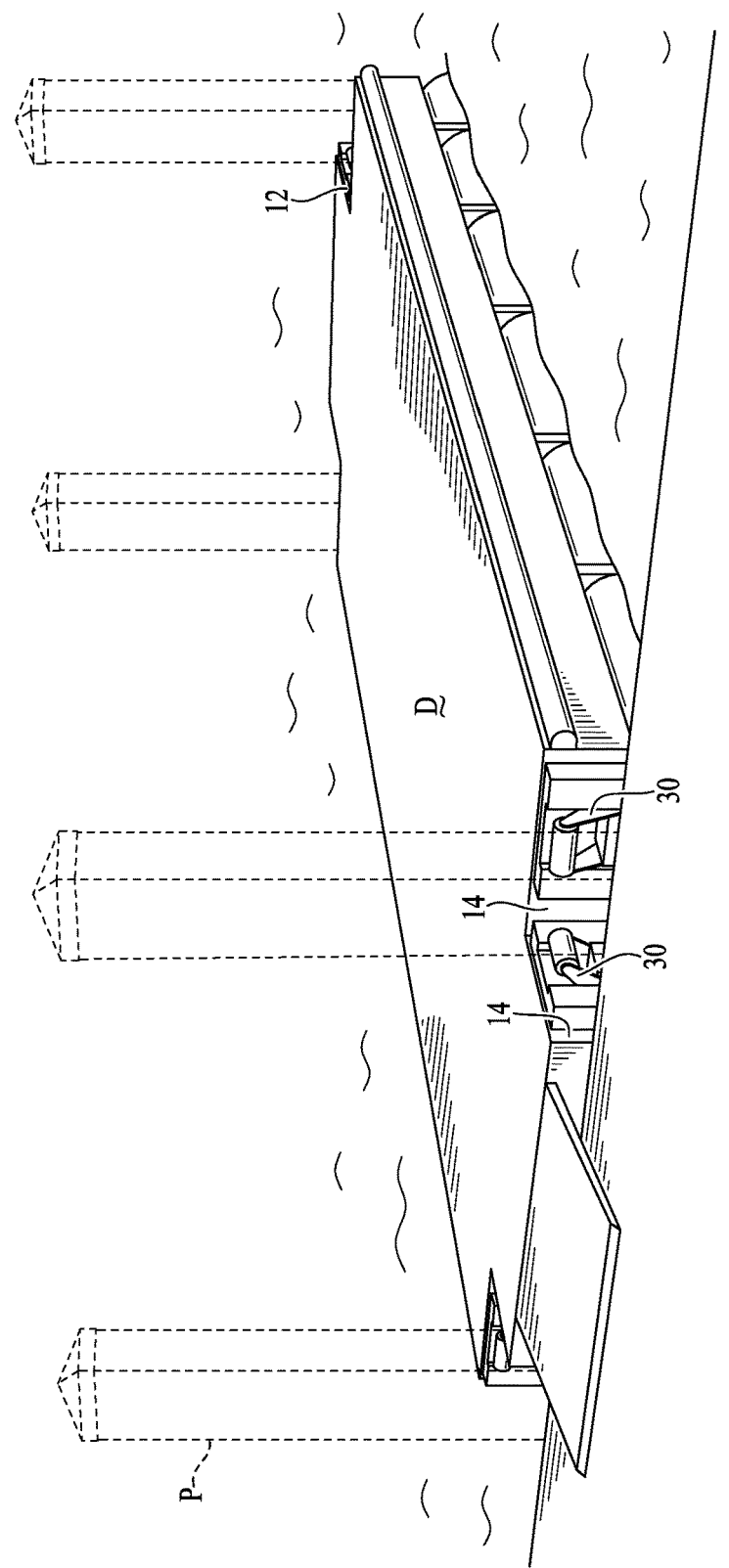
FIG. 1 is a perspective view of a floating dock system with a dampening pile guide system according to an example embodiment of the invention.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-5 show a dampening pile guide system 10 incorporating dampening and impact absorption devices 30 according to an example embodiment of the invention. The dampening and impact absorption devices 30 generally include a contact element 80 pivotally coupled to a base 40. The base 40 comprises at least one dampening element configured to resist the pivotal motion of the contact element 80 relative to the base. The dampening element is also configured to bias the contact element 80 toward and equilibrium position. The dampening pile guide system 10 can be installed on a floating marine dock. The floating marine dock generally comprises a horizontal deck platform D and at least one generally vertical anchor piling P. The platform D typically comprises one or more floats, allowing the platform to rise and fall along the piling P as the tide swells and recedes, waves interact with the platform, or other dynamic forces act on the platform. The contact element 80 of the dampening and impact absorption devices 30 are configured to engage the anchor piling P as the horizontal deck D is moved toward the piling P. The dampening pile guide system 10 is configured to reduce or dampen impact forces transmitted from the deck platform D to the pilings P. In other embodiments, the dampening system can be used in any system comprising a stationary component and a movable component positioned adjacent to the stationary component such that the movable component might contact the stationary component.

In example embodiments, the horizontal deck D has a generally rectangular shape with anchor pilings P positioned at the four corners of the deck. As shown in FIG. 1, each corner of the deck D includes a cutout 12 dimensioned to accommodate the respective piling P. In the depicted embodiment, the cutout 12 has a rectangular shape such that the cutout includes two sidewalls 14 on the deck D. In other embodiments, the cutout can be polygonal or otherwise configured. In alternate embodiments, the deck D does not include a cutout 12 and the pilings are positioned adjacent to the deck. In the example embodiment, two dampening devices 30 are positioned in the cutout 12 with one dampening device on each sidewall 14 of the cutout. The dampening devices 30 are positioned to engage a piling P when the deck D moves toward the piling. In alternate embodiments, where the deck D does not include a cutout 12, the dampening devices 30 can be positioned on the outer periphery of the deck. In example embodiments, the dampening devices 30 are attached directly to the deck D. In other embodiments, the dampening devices 30 are attached to a frame or plate that is attached to the deck D.

Figure 2:
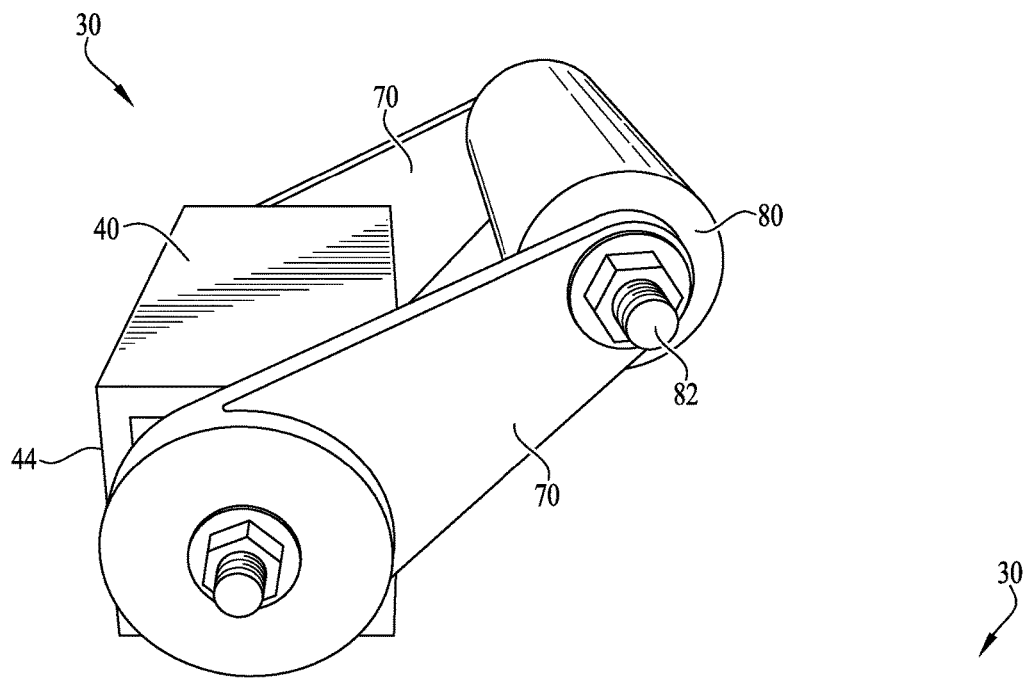
FIG. 2 is a perspective view of the dampening and impact absorption device of the dampening pile guide system of FIG. 1.
Figure 3A:
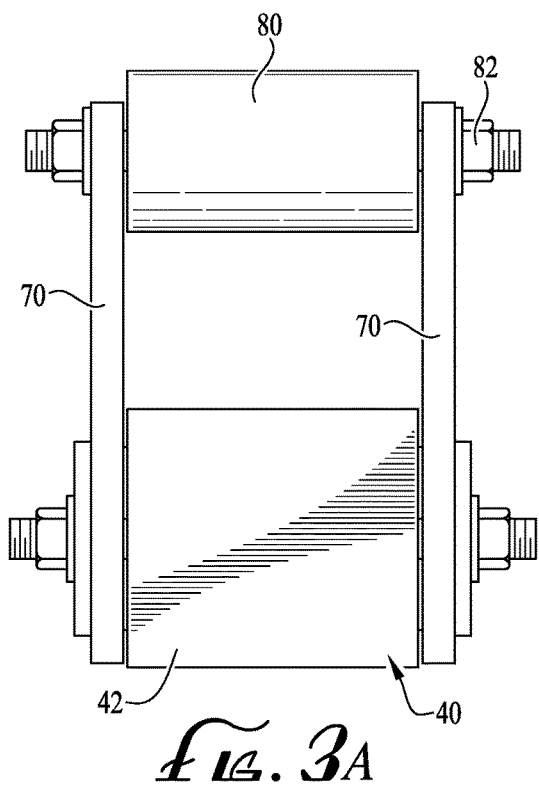
FIG. 3A is a front view of the dampening and impact absorption device of FIG. 2.
Figures 3B, 3C:
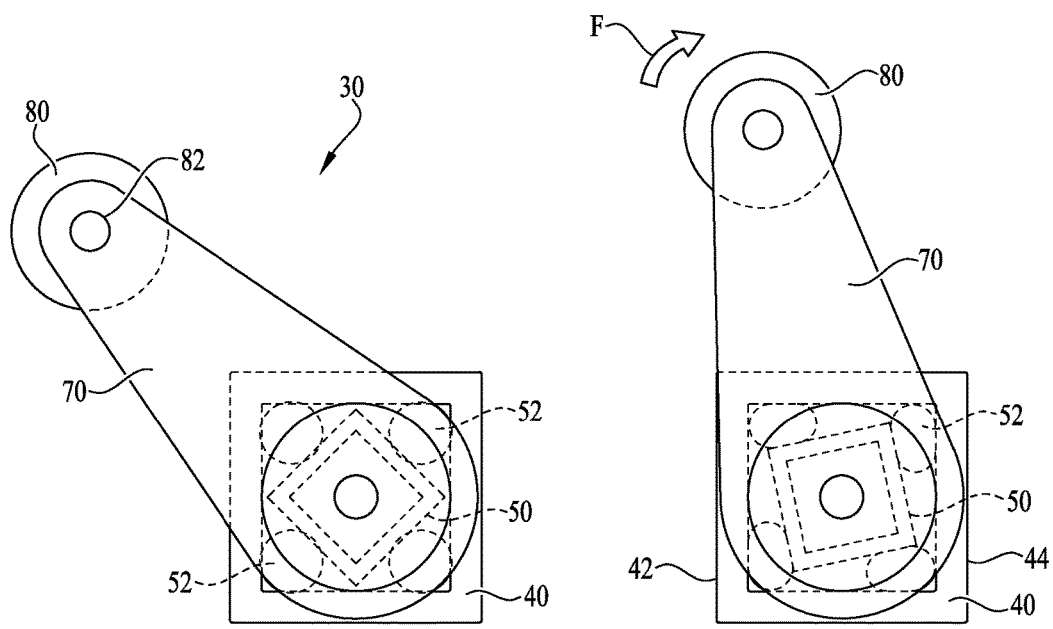
FIG. 3B is a side detailed view of the dampening and impact absorption device of FIG. 2 in a first position.
FIG. 3C is a side detailed view of the dampening and impact absorption device of FIG. 2 in a second and third position.
Figure 4:
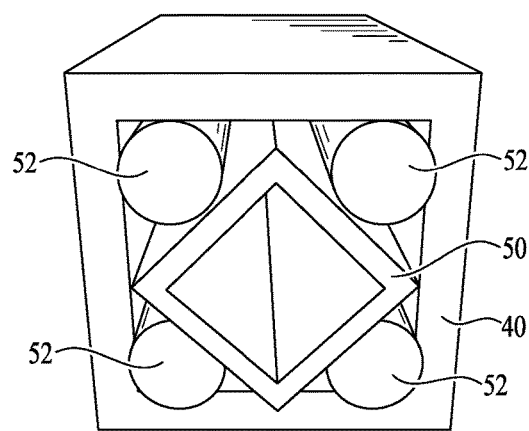
FIG. 4 is a partial assembly view of the mounting portion of the dampening and impact absorption device.

FIGS. 2-4 show further details of the dampening and impact absorption device 30. The dampening element of the dampening and impact absorption device 30 comprises a resilient, deformable elastomeric journaling damper mechanism comprising an outer frame channel 40, an inner axle shaft 50 extending generally coaxially through the outer frame channel, and at least one resilient, deformable elastomeric bushing or abutment component 52 operatively engaged between the exterior of the inner axle shaft and the interior of the outer frame channel. In the depicted embodiment, the outer frame channel 40 comprises a section of square or rectangular hollow channel stock, having an exterior surface, including a front wall 42 and a back wall 44, configured for attachment to a frame or dock platform D in floating dock system applications. The outer frame channel 40 has a hollow interior forming an inner chamber having a square or rectangular cross-sectional configuration. In the depicted embodiment, the inner chamber of the outer frame channel 40 is generally square, having substantially equal interior side-to-side length and width dimensions. In the depicted embodiment, the inner axle shaft 50 also comprises a generally rectangular or square (or diamond-shaped when viewed in the orientation of FIG. 3B) cross-sectional configuration, and has a maximum exterior corner-to-corner dimension less than or equal to the interior side-to-side length and width dimension of the inner chamber of the outer frame channel 40. In other words, the inner axle shaft 50 fits inside the inner chamber of the outer frame channel 40 even when the inner axle shaft is rotationally offset about 45° relative thereto, as shown in FIG. 4. In the depicted embodiment, four elastomeric bushing or abutment components 52 are provided, one being positioned in each of the internal corners of the inner chamber of the outer frame channel 40. As shown in FIG. 4, the abutment components 52 are positioned in between the inner axle shaft 50 and the outer frame channel 40 to isolate the axle shaft from the frame channel. The inner axle shaft 50 is positioned coaxially within the outer frame channel 40, and rotationally offset about 45° relative thereto, forming four generally triangular corner voids within which the elastomeric bushing or abutment components 52 are positioned, as shown in FIGS. 3B, 3C, and 4. This dampening system is generally described as a rotational dampening system.

First and second side arms 70, having a first end and a second end, are positioned on either end of the outer frame channel 40. Generally, the arms 70 are positioned such that their first ends are concentrically aligned with the inner chamber of the outer frame channel. In example embodiments, the arms 70 are attached to the inner axle shaft 50 at opposite sides thereof. In the depicted embodiment, a roller or contact element 80 is rotationally mounted between the second ends of first and second side arms 70, for example by a bolt or pivot pin 82. In this manner, when a lateral force F (see FIG. 3C) is applied to the roller or contact element 80, for example resulting from contact with a dock anchor piling, the roller 80 is pushed back, causing the side arms 70 to rotationally pivot from an equilibrium position (for example oriented at an oblique angle of about 30°-60° from horizontal, for example about 45°), shown in FIG. 3B, to a dampening position, shown in FIG. 3C. In the equilibrium position, the side arms 70 are angled toward the front wall 42 of the outer frame channel 40. To move to the dampening position, the roller 80 and side arms 70 are moved toward the rear wall 44 of the outer frame channel 40. In example embodiments, the pivot arms 70 are configured to have a pivotal range of motion of between about 20°-45°, for example about 33°, and a lateral range of motion of between about 1"-6", for example about 3".

When the arms 70 move between the equilibrium position and the dampening position, the movement causes the inner axle shaft 50 to rotate within the inner chamber of the outer frame channel 40 to a pivot position shown in FIG. 3C. Coaxial rotation or journaling of the inner axle shaft 50 within the outer frame channel 40 resiliently compresses the elastomeric bushings or abutment components 52 between the exterior corners of the inner axle shaft and the interior corners of the inner chamber of the outer frame channel 40, as shown in FIG. 3C. The elastomeric resilience of the bushings or abutment components 52 absorbs and dampens impact and noise, reduces forces transmitted between elements of the dampening and impact absorption system, and biases the side arms 70 and roller 80 back toward the equilibrium position.

In the depicted embodiment, the elastomeric bushings or abutment components 52 are configured as rods or tubes having a generally circular cross-sectional profile. In alternate embodiments, the elastomeric bushings or abutment components 52 may be otherwise configured, for example having triangular profiles configured to fit more closely within the spaces between the exterior corners of the inner axle shaft and the interior corners of the inner chamber of the outer frame channel. Also, the durometer or hardness of the elastomeric bushings or abutment components 52 may be selectively varied to control the dampening effect, and optionally may be interchangeable between components of two or more differing hardnesses to allow adjustment of the dampening effect. In example embodiments, the elastomeric bushings or abutment components 52 are formed of natural rubber, neoprene or other natural or synthetic compressible resilient material(s) of construction, for example having a durometer of between about 40-90, for example a durometer of about 52. In other embodiments, the dampening elements 52 can be made of other deformable materials such as rubber or foam.

Figure 5:
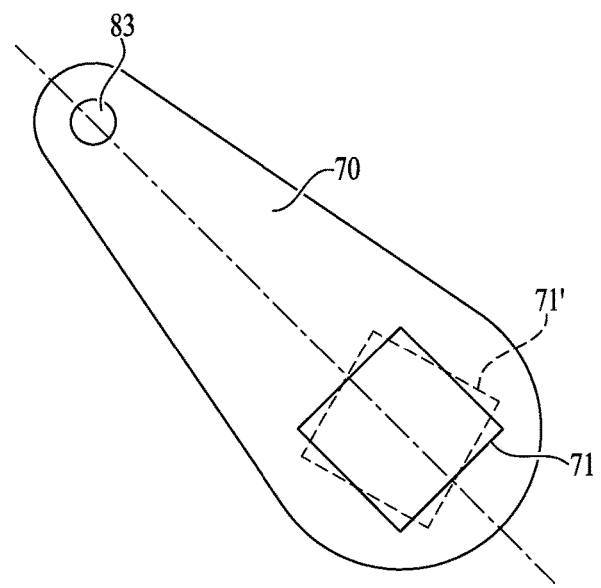
FIG. 5 is a detailed side view of alternative configurations of a side arm portion of a dampening and impact absorption device according to an example embodiment of the present invention.
Figure 6A:
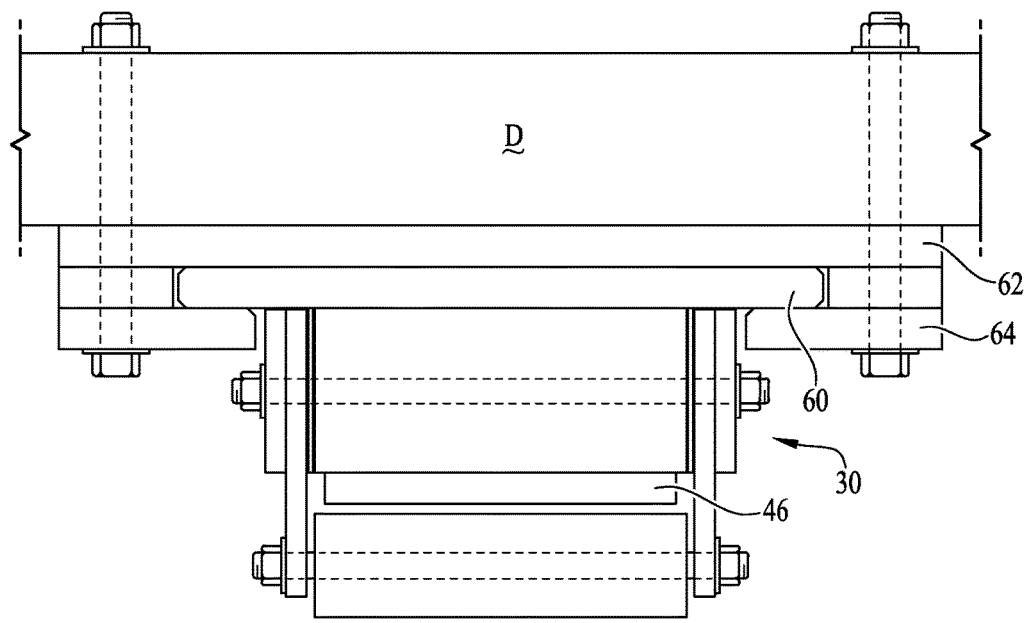
FIG. 6A is a detailed top view of a dampening and impact absorption device according to another example embodiment of the invention.
Figure 6B:
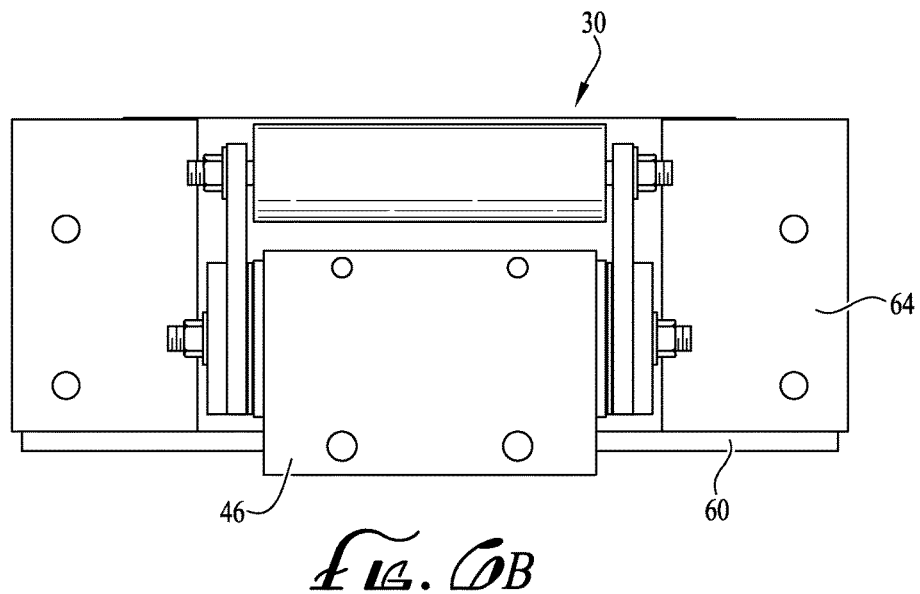
FIG. 6B is a detailed front view of the dampening and impact absorption device of FIG. 6A.
Figure 6C:
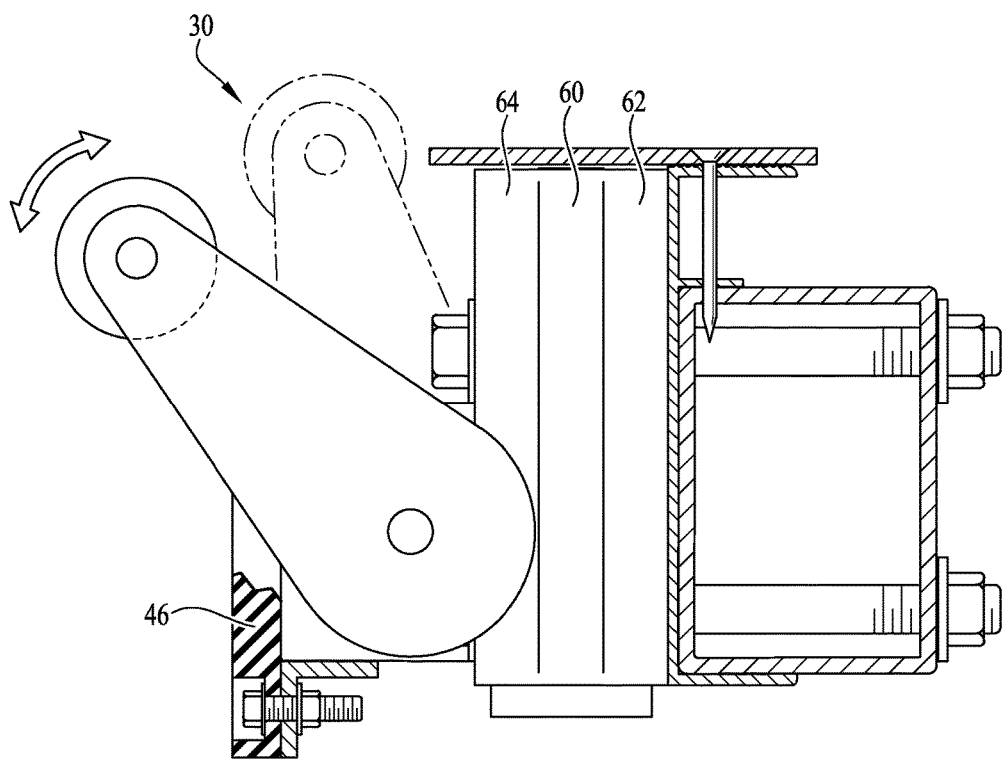
FIG. 6C is a detailed side view of the dampening and impact absorption device of FIG. 6A.
Figure 7:
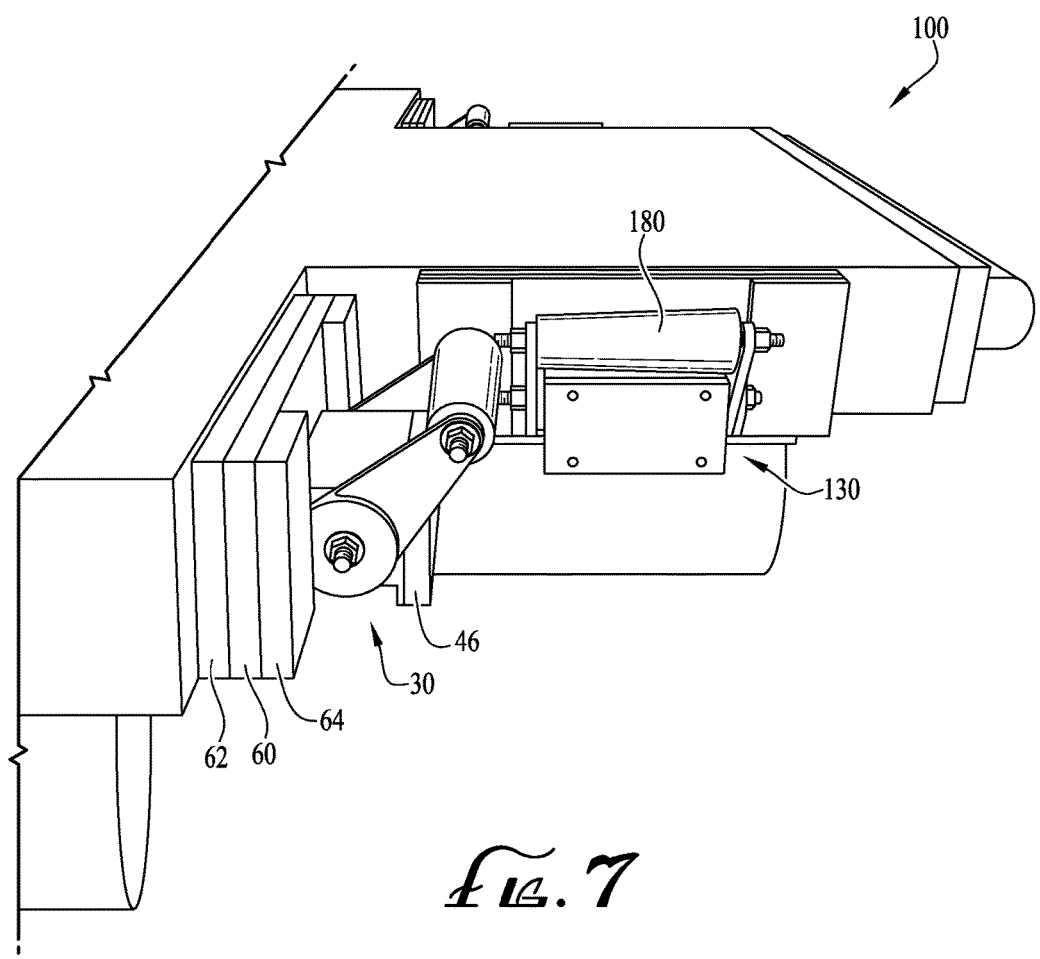
FIG. 7 is a perspective view of a dampening pile guide system incorporating the dampening and impact absorption device of FIG. 6A.

Optionally, the movement and dampening effect of the damper mechanism may be adjusted by advancing or retarding the motion of the arms by clocking the assembly, as shown in FIG. 5. For example, the side arms 70 may be fabricated with a square opening 71 that is generally aligned with (i.e., 12-o'clock or 0°) a central longitudinal axis of the arm (i.e., extending through the center of the square opening and the hole 83 which receives the pivot pin 82, as shown in solid lines in FIG. 5; or the square opening 71' can be formed at a clocked angle that is rotationally offset from the central longitudinal axis of the arm (for example at about 12:30-o'clock or 15°), as shown in broken lines in FIG. 5, to allow more distance between the piling and the roller, which may be helpful for example in applications where the dampening system is retro-fitted to an existing dock.

In example embodiments, the structural support components of the dampening and impact absorption system 10 and the impact absorption devices are fabricated from substantially rigid structural materials, such as steel, aluminum or other materials. In particular embodiments, the structural materials are corrosion resistant, such as for example stainless steel, aluminum, or other materials resistant to salt-water corrosion effects. The structural support components may be attached to one another and/or to the dock platform or other system components by welding, bolts, fasteners or other attachment means. In example embodiments, the resilient, deformable components are fabricated from natural or synthetic rubber, neoprene, compressible polymeric materials, or other elastomeric materials, and in particular embodiments from corrosion resistant and/or salt-water resistant materials.

FIGS. 6-10 show a dampening and impact absorption system 100 according to another example embodiment of the present invention. The dampening system 100 incorporates dampening and impact absorption devices 30 similar to those of the previous embodiment. In the depicted embodiment, the rear wall 44 of dampening device 30 is attached to a mounting plate 60. The rear wall 44 can be welded or otherwise fastened to the mounting plate 60. The mounting plate 60 can be bolted between a receiver plate 62, attached to the floating dock deck D, and cover plate 64 positioned on the opposite side of the mounting plate 60. The dampening device 30 can also include a rub or stop block 46 attached to the front face 42 of the dampening device 30. The stop block 46 is positioned to engage a piling that contacts the base 40 of the dampening device 30. The stop block 46 can be formed of rubber or another deformable material and is designed to protect the outer frame channel 40 from damage resulting from contact from the piling P.

The dampening and impact absorption system 100 can also include a dampening and impact absorption device 130 with a tapered roller or contact element 180. The tapered dampening device 130 is substantially similar to the impact device 30 of the previous embodiment. However, in the depicted dampening device 130, shown in FIGS. 7-9, the roller 180 is tapered such that the diameter at a first end is smaller than the diameter at a second end. The tapered dampening device 130 is used when the piling P' is not squared with the cutout in the floating dock deck, as shown in FIG. 9. Therefore, the piling P' will contact the roller 180 at an angle that can be accommodated by the taper. The tapered dampening device 130 can be used when the dampening and impact absorption system 100 is attached to a pre-existing floating dock.

FIG. 10 shows a dampening and impact absorption system 200 according to another example embodiment of the present invention. In this system 200 two floating dock decks D are positioned adjacent to one another such that the cutouts 12 of each deck align. As in the previous embodiment, each cutout 12 includes two sidewalls 14. In this configuration, four dampening devices 30 can be positioned around a larger piling (not shown) positioned between the cutouts 12 in the two decks D.

Figure 11:
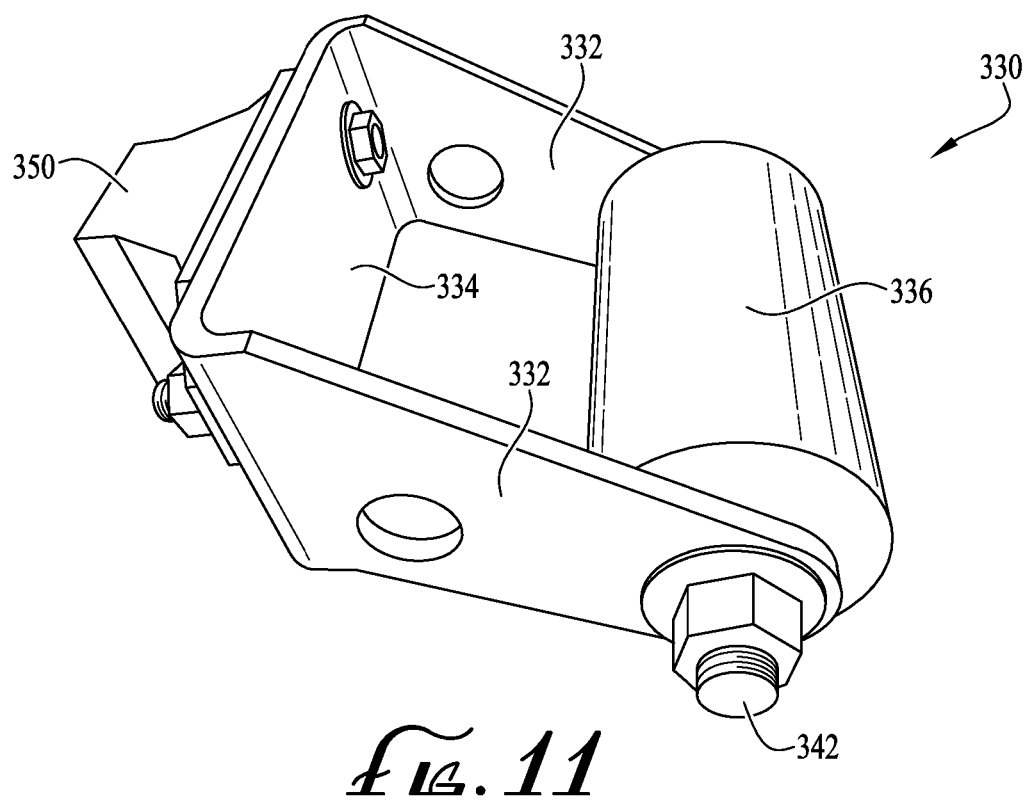
FIG. 11 is a perspective view of a dampening and impact absorption device according to another example embodiment of the invention.
Figure 12B:
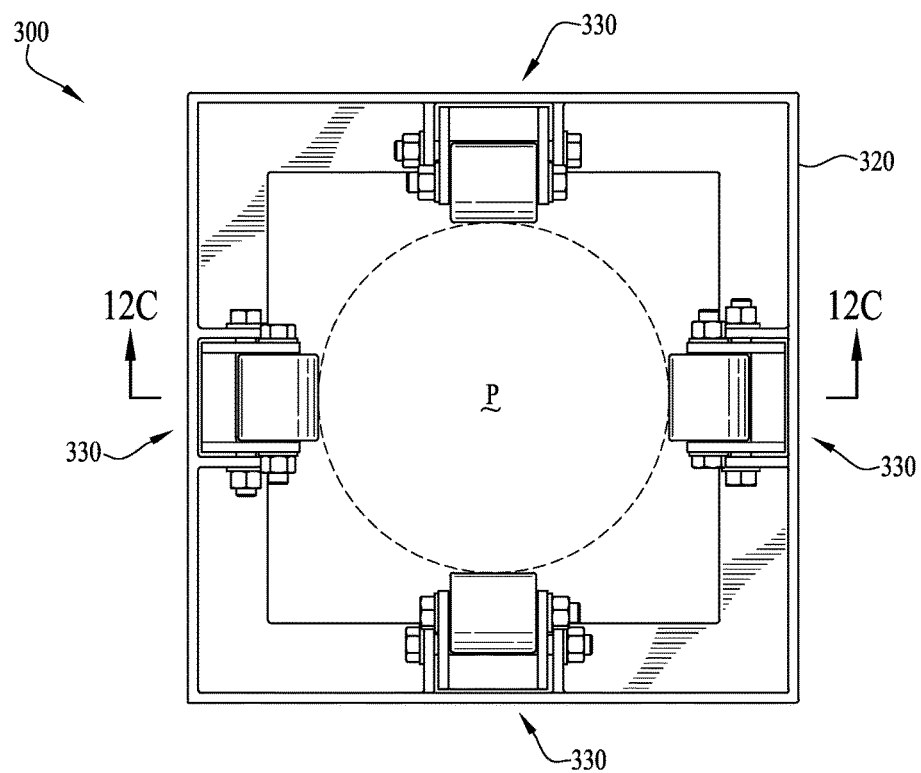
FIG. 12B is a top view of the dampening pile guide system of FIG. 12A.
Figure 12C:
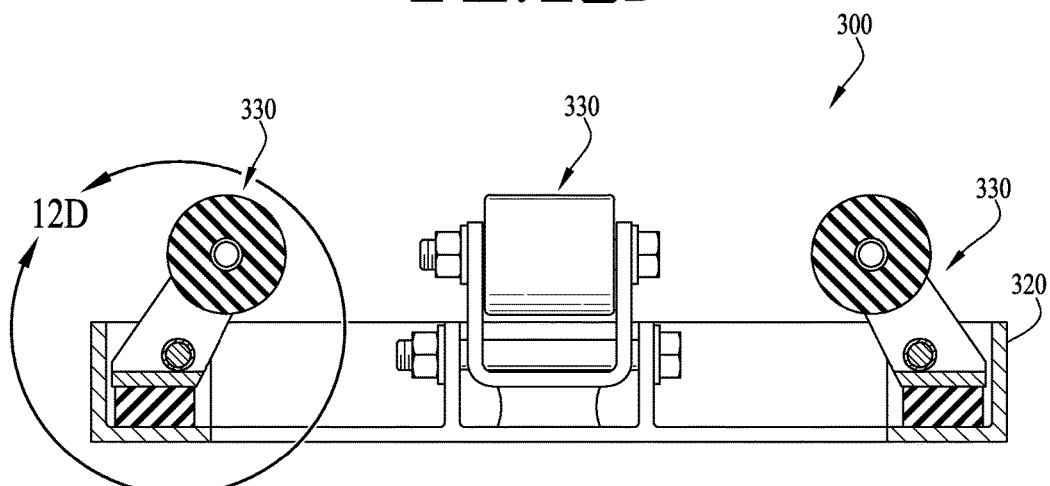
FIG. 12C is a cut-away side view of the dampening pile guide system of FIG. 12A.
Figure 12D:
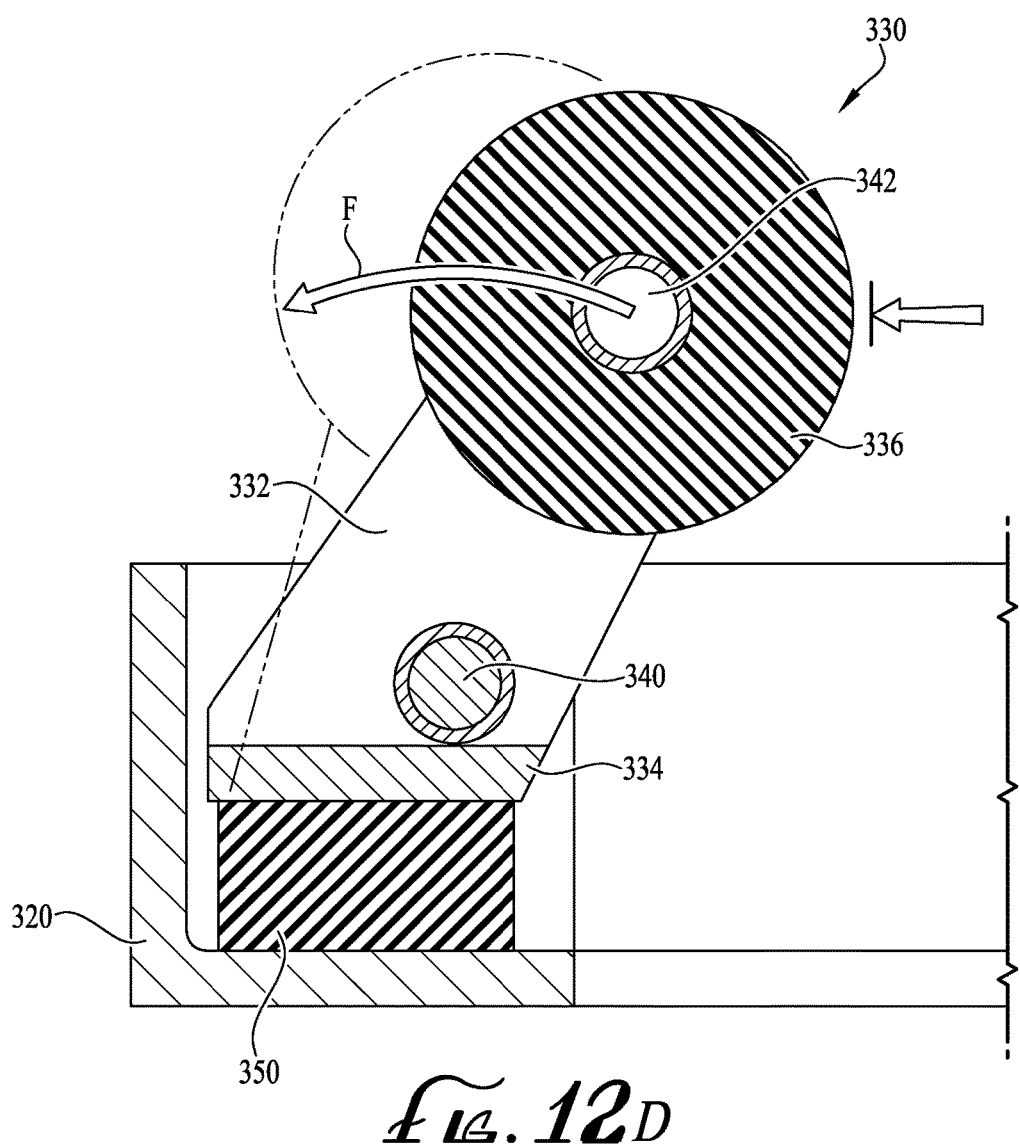
FIG. 12D is a detailed view of the dampening and impact absorption device of FIG. 12C.

FIGS. 11-12 show a dampening and impact absorption system 300 incorporating dampening and impact absorption devices 330 according to another example embodiment of the invention. As in the previous embodiment, the dampening and impact absorption system 300 is configured for application as part of a floating marine dock comprising a generally horizontal dock platform D and at least one generally vertical anchor piling P. FIG. 11 shows the dampening device 330 of the dampening system 300. In the depicted embodiment, the system 300 includes a square or rectangular frame 320 configured to surround an opening in the platform D through which the piling P extends, as shown in FIG. 12A. In alternate embodiments, the frame may be polygonal or otherwise configured, or alternatively may be a single linear side element positioned adjacent a side of the platform D confronting a piling P. In example embodiments, the frame 320 comprises one or more segments of angle iron or steel angle or channel elements, for example welded together at corners or intersecting portions thereof. Although depicted with four dampening and impact absorption devices 330, in alternate embodiments, the dampening and impact absorption system 300 may comprise one, two, three, or more than four dampening and impact absorption devices, depending on the particular application.

Each dampening and impact absorption device 330, as shown in FIG. 11, comprises first and second side arms 332, arranged generally parallel to one another, and extending at an oblique angle (for example between about 30°-60°, or about 45°) from a first end affixed to a base plate 334 to a second end to which a roller 336 or other contact element is attached. In example embodiments, the base plate 334 and side arms 332 are fabricated as a unitary U-shaped or C-shaped yoke component, for example from a section of metal channel stock. The first and second side arms 332 define openings adjacent their first ends for receiving a mounting bolt or hinge pin 340 extending there through, and pivotally coupling the side arms to the mounting brackets of the frame 320 (as indicated by the arcuate directional arrow P in FIG. 12D). The dampening and impact absorption device 330 also includes a dampening element 350. In the depicted embodiment, the dampening element 350 is formed from a resilient, deformable elastomeric bumper or bushing coupled between the base plate 334 and the frame 320, to provide elastic deformation and impact absorption upon pivotal articulation of the side arms 332 resulting from lateral forces applied to the roller 336 (as indicated by the horizontal direction arrow F in FIG. 12D). The roller or contact element 36 is optionally rotationally mounted between the side arms 332 by a bolt, pin or axle 342, to provide smooth rolling contact with the piling P as the platform rises and falls due to tides, wave action or other dynamic forces. Thus, as the dock platform D to which the frame 320 is mounted moves laterally relative to the piling P, the roller 336 of one or more dampening and impact absorption devices 330 contacts the piling and applies a force (F), causing the arms 332 to pivot (P) about the mounting pin 340, elastically compressing the bushing 350 between the base plate 334 and the frame 320. The resilience or hardness of the elastomeric bushing 350 absorbs and dampens the impact and noise generated, and can be selectively varied according to the forces anticipated for a particular application, to provide more or less compressibility. The dampening and impact absorption devices 330 are mounted to the frame 320, for example generally centrally positioned along each of the four sides of the frame, for example by mounting brackets affixed to the frame.

Figure 13A:
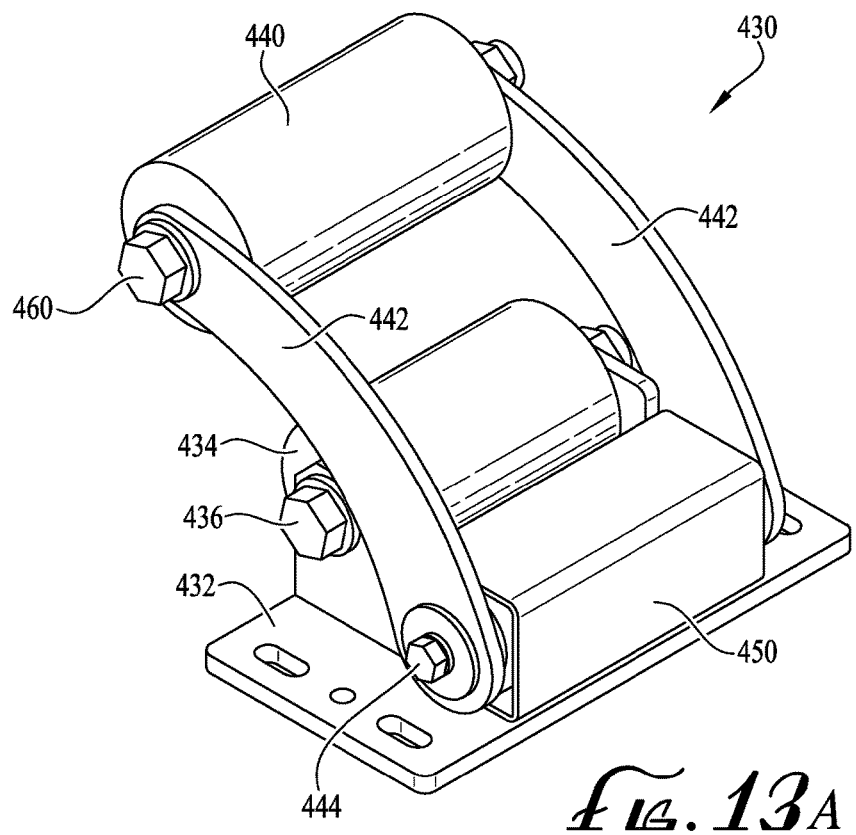
FIG. 13A is a perspective view of a dampening and impact absorption device according to another example embodiment of the invention.
Figure 13B:
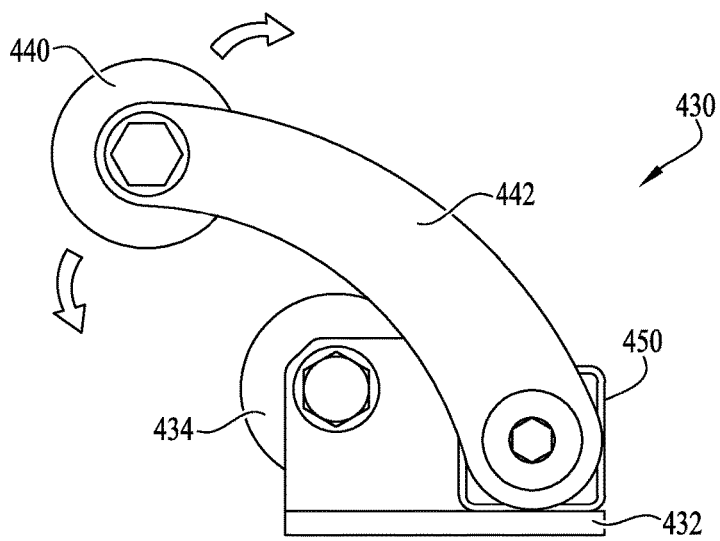
FIG. 13B is a side view of the dampening and impact absorption device of FIG. 13A.

FIGS. 13A-13E show another example embodiment of a dampening and impact absorption device 430, according to another form of the invention. The dampening and impact absorption device 430 of this embodiment may be incorporated into a dampening and impact absorption system in substantially similar fashion to that described above. The dampening and impact absorption device 430 comprises a mounting base or bracket 432 for attachment to the frame or platform of a dock system, or to other structures with which it may be utilized. A first fixed roller or contact element 434 is rotationally mounted in a fixed position between a pair of flanges of the mounting bracket 432, for example by a bolt or hinge pin 436. A second roller or contact element 440 is pivotally mounted to the mounting bracket 432 by first and second side arms 442. First or proximal ends of the side arms 442 are pivotally coupled to the mounting bracket 432 by a proximal end bolt or hinge pin 444 extending through openings in the side arms and through a mounting channel 450 attached to the mounting bracket. The second roller or contact element 440 is rotationally mounted to the free second or distal ends of the side arms 442 by a distal end bolt or hinge pin 460. In this manner, forces applied against the second roller or contact element 440 impart a pivotal motion on the side arms 442 to absorb and dampen impacts, noise and vibration. FIGS. 13D and 13E show an example range of motion of the side arms 442 and second roller or contact element 440. FIG. 13D shows the side arms 442 in an equilibrium position such that the side arms form an angle α above the horizontal. FIG. 13E shows the side arms 442 in a dampening position such that the side arms form an angle β above the horizontal. In example embodiments, the angle α is between about 25° and 45°. In other embodiments, the angle is around 35°. In example embodiments, the angle β is between about 55° and 75°. In other embodiments, the angle is around 65°. The angles α and β can be adjusted based on the configuration of the dampening system and the distance between the piling P and the dampening device 430. A resilient, deformable elastomeric journaling damper mechanism may be incorporated within the mounting channel 450, as described in greater detail above, or alternatively one or more resilient biasing or spring members may be provided between the mounting base 432 and one or both side arms 442 to absorb and dampen the impact and noise generated as forces are applied against the second roller or contact element 440 imparting pivotal articulation of the side arms.

FIGS. 14A-B show another example embodiment of a dampening and impact absorption device 530, according to another form of the invention. The device 530 of this embodiment includes a linear, rather than a rotational dampening element. The dampening and impact absorption device 530 of this embodiment may be incorporated into a dampening and impact absorption system in substantially similar fashion to that described above. The dampening impact absorption device 530 includes a mounting base or bracket 532 and a first contact element mounted to the bracket by a bolt or hinge pin 536 as in the previous embodiment. The device 530 also includes a second contact element 540 rotationally mounted to first and second side arms 542 that are pivotally mounted at a proximal end to the base 532. The second contact element 540 is attached to the distal end of the side arms 542 by a distal end bolt or hinge pin 560, as in the previous embodiment. The device 530 can also include a linear dampening element 570. The dampening element 570 generally extends between the base 532 and the first and/or second side arm 542. The linear dampening element 570 is attached at a first end to the side arm 542 and at a second end to the base 532. The dampening element 570 is configured to resist, and therefore dampen, the pivotal movement of the side arms 432 and second contact element 540 between the equilibrium position shown in FIG. 14A and the dampening position shown in FIG. 14B. In the example embodiment, the dampening element 570 is a band formed from an elastic or elastomeric material. The band 570 is attached at a first end to the distal end bolt 560 on the side arm 542 and attached at a second end to the bolt or hinge pin 536 on the bracket 532. In other embodiments, the band can extend between other points on the bracket 532 and side arm 542. The dampening strength of the device 530 can be adjusted by varying the elastic strength of a single dampening band or element 570. This can be accomplished by varying the durometer of the elastomer in the band 570. Alternatively, the dampening element 570 can comprise a plurality of elastomeric bands coupled between the base 532 and the side arm 542. In this embodiment, the dampening strength can be adjusted by adding or removing bands 570 and therefore can be quickly adjusted by the user.

While primarily described herein with reference to example embodiments adapted for use in connection with floating dock systems, alternative embodiments of the dampening and impact absorption system and the impact absorption devices of the present invention may be adapted to different applications, for example in automotive chassis or bumper shock or impact absorption devices, loading docks, parking decks, traffic control devices, elevators, furniture drawers, door stops, and/or various other uses and applications where two or more components move relative to one another and impact and/or noise dampening and/or absorption are found desirable. In example embodiments, the dampening system and devices according to the present invention can be provided as original equipment parts of a new dock or other system, or alternatively can be provided as retrofit equipment for installation to existing systems.

While the invention has been described with reference to example embodiments, it will be understood by those skilled in the art that a variety of modifications, additions and deletions are within the scope of the invention, as defined by the following claims.

What is claimed is:

1. A dampening and impact absorption device comprising:
   an outer frame component;
   an inner component housed within the outer frame component; and
   at least one dampening element operatively coupled between the outer frame component and the inner component;
   wherein the inner component is an inner axle shaft, the inner axle shaft being rotationally offset relative to the outer frame component, whereby the at least one dampening element is engaged between exterior corners of the inner axle shaft and interior corners of the outer frame channel.

2. The dampening and impact absorption device of claim 1, further comprising a contact element coupled to the inner component, wherein the contact element is movable between an equilibrium position and a dampening position.

3. The dampening and impact absorption device of claim 2, further comprising at least one side arm coupled between the contact element and the inner component.

4. The dampening and impact absorption device of claim 3, wherein the at least one side arm is positioned at a first angle above the horizontal in the equilibrium position and a second angle above the horizontal in the dampening position.

5. The dampening and impact absorption device of claim 4, wherein the difference between the first angle and the second angle is between about 25° and about 45°.

6. The dampening and impact absorption device of claim 2, wherein the contact element comprises a roller.

7. The dampening and impact absorption device of claim 2, wherein the contact element has a tapered cross-section.

8. The dampening and impact absorption device of claim 1, wherein the at least one dampening element is formed from an elastomeric tube having a generally circular cross-sectional profile.

9. The dampening and impact absorption device of claim 1, wherein the at least one dampening element is formed from a resilient material having a durometer of between about 40-90.

10. The dampening and impact absorption device of claim 1, wherein the outer frame component is configured for attachment to a deck of a floating dock system.

* * * * *